May 20, 1958 R. C. HAUETER 2,835,801

ASYNCHRONOUS-TO-SYNCHRONOUS CONVERSION DEVICE

Filed May 21, 1953

INVENTOR
Ruth C. Haueter
BY
Howard L. Rose
AGENT

United States Patent Office 2,835,801

Patented May 20, 1958

2,835,801

ASYNCHRONOUS-TO-SYNCHRONOUS CONVERSION DEVICE

Ruth C. Haueter, Washington, D. C., assignor to the United States of America as represented by the Secretary of Commerce Application May 21, 1953, Serial No. 356,612

8 Claims. (Cl. 250—27)

(Granted under Title 35, U. S. Code (1952), sec. 266)

The invention described herein may be manufactured and used by or for the Government of the United States for governmental purposes without the payment to me of any royalty thereon in accordance with the provisions of 35 United States Code (1952) Section 266.

The present invention relates to a synchronizer for use in the input circuitry of an electronic computer and in particular to a device which upon receiving a long slow pulse can produce one and only one pulse in synchronism with the computer operation.

Before a computer can begin a given computation the information to be operated upon must be fed into the machine. Several difficulties arise in this operation because the inherent characteristics of the input equipment—which supplies information to the computer—are vastly different from the characteristics of the computer. The first and most obvious difference between these characteristics is the much slower operating rates of the external input equipment; but the main distinction is the fact that the external devices (whether they are mechanical typewriters or high-speed magnetic recorders) are all bound by mechanical inertia or friction and therefore in most cases are incapable of following in rigorous synchronism with the computer's high-speed internal electronic circuitry. On this account, the input-output equipment cannot communicate directly with the internal units of the computer, but instead must communicate with special buffering equipment, which in turn communicates with the computer's high-speed memory. Since this buffering equipment has to communicate directly with the memory units, it must be able to operate as fast as the memory; and since it also must communicate with the sluggish input units, it must at the same time be able to operate at the slow, irregular, input rates.

The buffering process, in which information is transferred from the external equipment to the computer's internal memory, may be divided into three distinct phases. Incoming information is received from the input equipment in the form of pulse code signals, and these signals (if they are useful to the machine) must first be synchronized, then must be assembled into words, and finally must be transmitted into the computer's memory. The present invention is concerned with the first phase of this problem. A nonsynchronous pulse signal (generally of irregular repetition frequency and of uncertain duration) is converted into a unique pulse signal which is synchronous with—and of a shape acceptable to—the computer's internal circuitry. The source of these input signals may range all the way from a push-button switch-contact up to the output of an amplifier of a magnetic recording unit capable of transmitting pulse-code at the rate of many thousands of binary digits per second. All these diverse signals are converted into the same standard form in which binary digits are stored elsewhere throughout the computing system.

The pulse-synchronizing circuitry with which the present invention is concerned, receives from the input equipment an input signal which is both unsynchronized (with respect to the internal clock's repetition rate) and nonstandard (with respect to the internal circuitry's pulse-shape and duration). It is the function of the pulse synchronizer to derive from this input signal new internal signals possessing the following characteristics: First, the new internal signals must consist of pulses of standard shape and of timing acceptable to the internal high-speed switching circuitry of the machine. In this respect not only must the signals be of standard shape but marginal pulses—pulses of only partial amplitude or duration—must be eliminated. Second, there must be an exact one-to-one correspondence in meaning between the signals received from the outside and the pulses transmitted to the computer. This correspondence must persist even though the external triggering signal might long outlast the triggered internal pulse. For example, a signal from a relay contact lasting 100 milliseconds must result in only a single pulse of one microsecond duration—not 100,000 such pulses.

It is an object of the present invention to provide a device which is capable of detecting an incoming signal at any unsynchronous time.

It is another object of the present invention to provide a device which transmits to the computer only pulses of a standard time and width.

It is another object of the present invention to provide a device which eliminates marginal pulses and only permits pulses of the proper amplitude to enter the computer.

Another object of the present invention is to provide a device which can distinguish between the beginning of a new signal and the continuance of an old signal.

Another object of the present invention is to provide a device which will produce a signal at the output within one computer pulse time of the detection of an incoming signal.

Still another object of the present invention is to provide a device which is operated by the standard clock pulses and which does not require special timing pulses for operation.

Still another object of the present invention is to provide a device which will produce only one output signal for each incoming signal regardless of the duration of the incoming signal.

Other uses and advantages of the invention will become apparent upon reference to the specification and drawings.

The operation of the present device is broken down into four major phases. The strobe, or first phase, is the time during which the synchronizer senses an incoming pulse if one exists. The regeneration, or second phase, is the time during which marginal pulses are allowed either to build up to full amplitude pulses or to die out completely. The sensing, or third phase, is the interval during which an output pulse is provided to the computer. The off, or fourth phase, is the interval during which the components are allowed to return to their quiescent condition.

Figure 1:
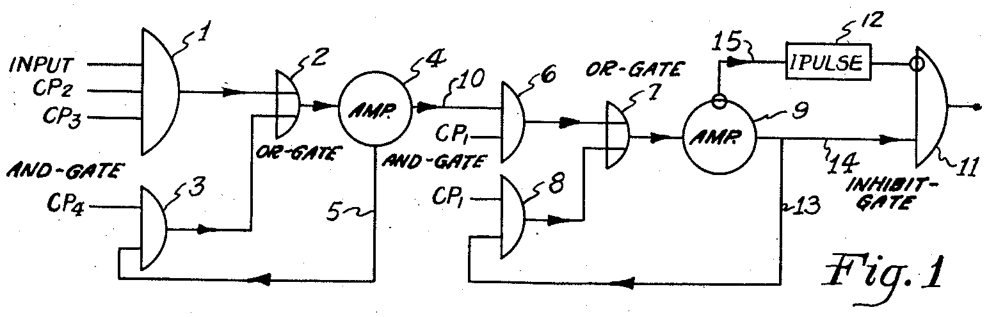
Figure 1 is a functional diagram of the apparatus of the present invention.

Referring to Figure 1, which is an embodiment of the present invention, there is provided a coincidence gate 1 having three inputs. One input is connected to receive the clock pulse $CP_2$, the second input is connected to receive the clock pulse $CP_3$, and the third input is connected to receive the input signal from the external circuitry. The output of the coincidence gate 1 is connected to one input of the mixer gate 2. The other input to the mixer gate 2 is connected to the output of the coincidence gate 3. The output of the mixer gate is connected to the input to the pulse-train amplifier 4.

A coincidence gate is a device which produces an output only when all of the input leads are energized at the same time. If any one of the input leads remains unenergized, a coincidence gate produces effectively no output. If all of the input leads are simultaneously fully energized, a coincidence gate produces full output. If, on the other hand, some of the input leads are only partially energized, the output of a coincidence gate may depend on the amplitude of energization of these partially-energized leads. A mixer gate is a device which produces a full output pulse when any one of its input leads is fully energized. It produces no effective output pulse only when all of its inputs are unenergized. If one or more of the input leads is partially energized the mixer gate output may depend on the amplitude of energization of the input leads. For a more complete description of the operation of these devices and the pulse-train amplifier 4, and for a description of the circuitry involved, reference is made to application Serial No. 244,446, for Gate Circuitry, filed August 30, 1951, by Robert D. Elbourn and Ralph J. Slutz.

One output 5 of the pulse-train amplifier 4 is connected to the first input of the coincidence gate 3. The other input to the coincidence gate is connected to receive a clock pulse $CP_4$. The other output 10 of the pulse-train amplifier 4 is connected to one input of the coincidence gate 6, the other input of which is connected to receive the clock pulse $CP_1$. The output of the coincidence gate 6 is connected to the first input of the mixer gate 7, the other input of which is connected to the output of the coincidence gate 8. The output of the gate 7 is connected to the input of the pulse-train amplifier 9. The first output 13 of this amplifier is connected to one input of the coincidence gate 8, the other input of which is connected to receive the clock pulse $CP_1$. The second output 14 of the amplifier 9 is connected to the first input of the inhibitor gate 11. The inhibitor gate is a device which will produce an output at any time the input is energized unless a pulse of appropriate polarity is applied to the other, or inhibitor, input of the gate. For a complete explanation of the operation of this type of gate and the circuitry for obtaining a negative pulse from the pulse-train amplifier 9, reference is made to the aforementioned application. The third output 15 of the pulse-train amplifier 9, which provides negative pulses, is connected to the inhibitor input of the inhibitor gate 11 through the delay line 12, which delays a pulse presented to it for one pulse time.

Figure 2:
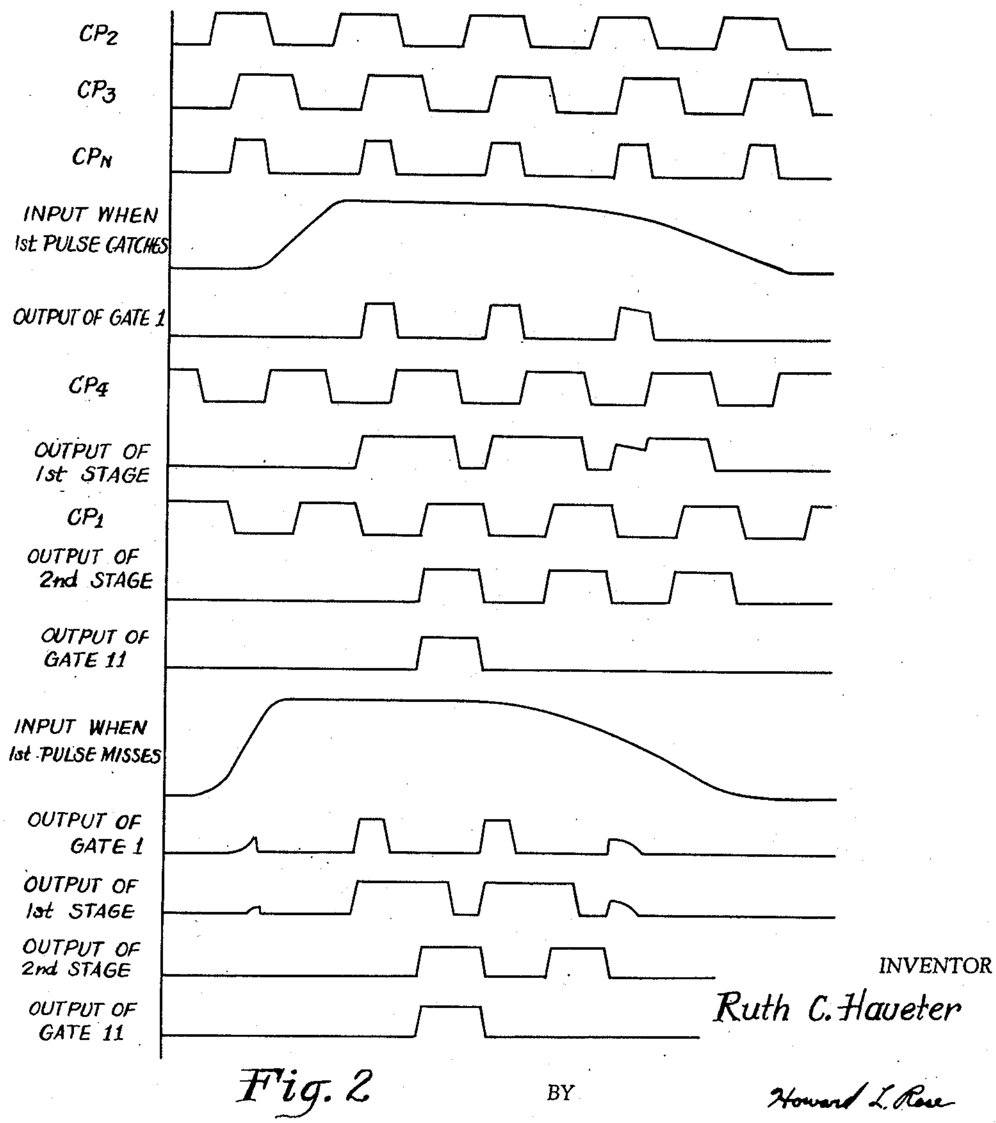
Figure 2 is a graph showing the relationship of the incoming pulse to the pulses of the internal circuitry of the computer.

The operation of the synchronizer will be explained with reference being made to the graphs of Figure 2. As previously mentioned, the pulses $CP_2$ and $CP_3$ are applied to separate inputs of the coincidence gate 1. Only during the period in which both pulses are applied can the coincidence gate pass a pulse appearing on the input lead. This overlap of clock pulses $CP_2$ and $CP_3$ is indicated as $CP_n$. It will be noted by Figure 2 that no input pulse was present at the first occurrence of the pulse $CP_n$ and therefore there was no output from the gate 1. However, during the second occurrence of the pulse $CP_n$ an input is present on the input lead of the gate 1 and therefore a pulse appears at the input to the mixer gate 2. This pulse appears on the output of the mixer gate and is fed to the input of the pulse-train amplifier 4. Assuming that there is no delay through the gate 2 and amplifier 4, which is essentially true, the pulse applied to the input of coincidence gate 3 by lead 5 occurs at the same time as the pulse in the graph of Figure 2 marked "output of gate 1." It will be noted that this last-mentioned pulse and the clock pulse $CP_4$ partially overlap and therefore a pulse appears on the output of gate 3 which is recirculated through the mixer gate 2 and amplifier 4. Therefore the input to the amplifier 4 will remain energized during the period of the clock pulse $CP_4$. The regeneration or second phase of operation occurs during such $CP_4$ interval. The regeneration occasioned by the signal recirculation through the feedback loop comprising conductor 5 and gates 3 and 2 establishes a means whereby storage of the signal applied to amplifier 4 is obtained. In other words, during the interval in which the referred-to signal regeneration process is self-sustaining, the information represented by such signal is being stored in the amplifier 4. The output pulse from the amplifier 4 which is fed to the first input of the coincidence gate 6 over lead 10, is coextensive in time with the input to the amplifier and therefore this pulse is represented in Figure 2 by the pulse marked "output of first stage." Upon occurrence of the clock pulse $CP_1$, which partially overlaps the pulse $CP_4$, the output of the first stage will be gated from the coincidence gate 6 to the input of the mixer gate 7. It will be noted that the output pulse of the gate 1 and the clock pulse $CP_1$ never overlap; that is, there is a definite time interval between the occurrence of these two pulses. This is of importance, as will be pointed out later in the explanation. The output of the mixer gate 7 is handled in the same way as the output of the mixer gate 2 and therefore, if a pulse occurs on the output of gate 7, during the time $CP_1$, the outputs of the pulse-train amplifier 9 will be energized during the interval that the clock pulse $CP_1$ occurs. This is the sensing or third phase of the operation. The second output 14 of the amplifier 9 is fed to the inhibitor gate 11 which, since the inhibitor input is not energized, will pass the first pulse. However, at the same time that this first pulse appears on the first and second outputs of the amplifier 9, a pulse is applied to the delay line 12 which delays this pulse one pulse time. This delayed pulse has the polarity necessary to activate the inhibiting input of the inhibitor gate. It will be noted from the graph of Figure 2 that the input pulse applied to the coincidence gate 1 extended over several strobe periods and therefore several pulses—in this particular instance, 3—appeared on the output of the first stage. Since, as pointed out above, only one of these pulses may pass through the computer for each input pulse, means must be provided for eliminating all output pulses other than the first. This is accomplished by means of the inhibitor gate 11 and delay line 12. Since the delayed output from the amplifier 9 is delayed one pulse time, it will appear at the inhibiting input of the gate 11 at the next time a pulse appears on the other input of the gate, thereby preventing this pulse from passing through the gate 11. Each pulse fed to the amplifier 9 provides a pulse on the inhibitor input one pulse time later, and therefore all pulses occurring after the first pulse will be prevented from passing through the inhibitor gate 11.

It will be noted from the above that the incoming pulse from the external circuitry had reached full amplitude between the occurrence of the first and second $CP_n$ pulses. This is the ideal case and some difficulty arises when the $CP_n$ pulse occurs during the rise time of the input pulse. Referring to the lower portion of Figure 2, the input pulse from the external circuitry is rising during the occurrence of the first pulse $CP_n$, and this produces a splinter pulse at the output of the coincidence gate 1, which is fed through the mixer gate 2 to the pulse-train amplifier. The output of the amplifier, which is also a splinter pulse, is fed to the input of the coincidence gate 3, and this splinter pulse may or may not be gated through this gate by the pulse $CP_4$. If the pulse is gated and again appears at the input to the pulse-train amplifier, one of three things may happen. First, the pulse may rise to full amplitude, second, it may die out completely, and third, under special circumstances, it may remain at the amplitude of the pulse applied to the amplifier 4.

These conditions may arise in the following manner. The amplifier 4, as a result of the regeneration loop consisting of gates 2 and 3 will normally tend to be either fully conducting or completely nonconducting. There is one condition under which the amplifier may remain only partially conducting and that is when the pulse applied is of such an amplitude as to produce a condition of unstable equilibrium in the amplifier.

If the initial pulse amplitude is above the value necessary to establish unstable equilibrium, the regenerative loop will cause it to rise to full amplitude during the interval between the beginning of the pulse $CP_4$ and the beginning of the pulse $CP_1$. It is essential that the pulse reach full amplitude before occurrence of $CP_1$ so that no misshapen pulses will appear at the output of the synchronizer.

If the pulse amplitude that is applied to the amplifier 4 is below the unstable equilibrium level, the second condition mentioned above, the pulse will die out completely before the occurrence of the pulse $CP_1$. Therefore the marginal pulse will not appear in the output and the output pulse representing this particular input pulse will be initially generated during the occurrence of the second $CP_n$ pulse.

If the pulse is of such an amplitude as to establish unstable equilibrium in amplifier 4, a partial amplitude pulse may pass into the computer. Although it is true that the condition of unstable equilibrium will last for only a very short period, this period is sufficiently long when compared with the repetition rate of the pulses in the modern electronic computers to produce a marginal pulse in the output. An example of this is as follows: Assuming that the normal output of the amplifier 4 is 15 volts and that unstable equilibrium will exist at 7 volts, then if a pulse is initially greater than 7 volts, the output will rise to 15 volts before the occurrence of the clock pulse $CP_1$. On the other hand, if the amplitude of the pulse is below 7 volts, regeneration will not occur and the amplitude will fall to zero before the occurrence of the $CP_1$ pulse. However, if the amplitude of the pulse is initially 7 volts, then the amplitude may stay constant at that value long enough to be gated through the coincidence gate 6 by the pulse $CP_1$. Therefore it is necessary to insure that unstable equilibrium will occur at such a point that the output pulses have a low enough amplitude so that they are below the gating level of the coincidence gate 6 and will not be passed by this gate. This result is accomplished by having the amplitude of the feedback voltage from the amplifier 4 (lead 5) twice that of the voltage on the output lead 10 of the amplifier 4. This causes the amplitude of the output pulses on lead 10 to be between 3 and 4 volts when a condition of unstable equilibrium exists, which voltage is so low that the gate 6 will not pass the pulse. Now, if the output of the amplifier to the coincidence gate 6 is initially 7 volts, the feedback voltage is 14 volts, and the output of the amplifier will immediately rise to a full 15 volts. On the other hand, if the output of the amplifier is between 3 and 4 volts, the feedback voltage is approximately 7 volts, which will produce unstable equilibrium.

In the circuit shown in Figure 1, a regeneration loop is provided for the mixer gate 7. This is done so that the pulse coming into gate 6 (which pulse is a $CP_4$ pulse) may be made to coincide with the $CP_1$ pulse. If regeneration were not employed, the output of the synchronizer would be another $CP_n$ pulse produced by the overlap of $CP_4$ and $CP_1$. However, it is not essential to the operation of the present invention that this pulse broadening take place in the synchronizer, since this operation can occur in the device utilizing the output of gate 11 without affecting the accuracy of the synchronizer. If the latter procedure is followed, the mixer gate 7 may be eliminated, in which case the output of gate 6 may be connected directly to the input of amplifier 9.

It will be noted from the curves of Figure 2 that the output pulse from the second stage occurs within one pulse time of the passage of the signal through the coincidence gate 1. It will also be noted that the asynchronous input pulse, which was fed to the synchronizer, has produced one pulse and only one pulse in the output of the device, which pulse is in synchronism with the computer operation and is of a shape and amplitude which can be used by the computer. The marginal pulses and splinter pulses have been eliminated, thereby preventing faulty operation of the computer.

As previously pointed out, a narrow strobe pulse, $CP_n$, is used, and the reason for this becomes clear at this point. The successful operation of this circuit depends on establishing the sequence of four phases consisting of strobe, regenerate, sense, and off. In the pulse repeater amplifier 4 there must be a finite time between the strobe pulse and the next-following sense phase, that is, the regenerate phase, and similarly between the sense phase and the next-following strobe phase, the off phase. The first of these times is provided to permit marginal pulses to build up or down to full or zero amplitude. The second of these times is provided to turn off the synchronizer and prepare it for the next possible operation. These finite times are conveniently provided by $CP_n$ in spite of the overlap which exists in the CP pulses. Thus the first of these times is provided by the portion of $CP_3$ that does not overlap $CP_2$, that is, the time between the termination of $CP_2$ and the beginning of $CP_1$. The second of these times is provided by the portion of $CP_2$ that does not overlap $CP_3$, the time between the end of $CP_4$ and the beginning of $CP_3$. The use of $CP_n$ is thus merely an efficient way of establishing the necessary cycle from the conveniently available clock pulses. The use of this overlap is not essential to the invention; any other means of providing the two finite times referred to above would be satisfactory (such as a separately-generated pulse that satisfies the timing requirements).

It will be apparent that the embodiments shown are only exemplary and that various modifications can be made within the scope of my invention as defined in the appended claims.

I claim:

1. A device for producing electric pulses of a controlled shape, phase, and duration, comprising a first and a second mixer gate; each of said mixer gates having a plurality of signal input leads and a signal output lead, a regenerative feedback circuit from the signal output lead of each mixer gate to one signal input lead of each mixer gate, control means connected in series within said feedback circuit for rendering said circuit operative, input means connected to one of the other of said signal input leads, said input means energizing said mixer gate for predetermined intervals upon receiving an input pulse; the said input means connected to said second mixer gate being connected to receive a portion of the signal developed in the feedback circuit of said first mixer gate.

2. A device for producing electric pulses of a controlled shape, phase, and duration, comprising a first and a second mixer gate; each of said mixer gates having a plurality of signal input leads and a signal output lead, a regenerative feedback circuit from said signal output lead to one of said signal input leads, control means connected in said feedback circuit for rendering said circuit operative, input means connected to one of the other of said signal input leads, said input means energizing said mixer gate for predetermined intervals upon receiving an input pulse; the said input means connected to said second mixer gate being connected to receive a portion of the signal developed in the feedback circuit of the said first mixer gate; an inhibitor gate having at least one signal input lead, at least one inhibitor input lead, and an output; and a delay line; one of said signal input leads of said inhibitor gate connected to receive a portion of the signal in the feedback circuit of said second mixer gate, said inhibitor input lead connected through said delay line to receive from said feedback circuit a pulse that is of suitable polarity to provide inhibition.

3. A device for producing electric pulses of a controlled shape, phase, and duration, comprising a first and a second mixer gate; each of said mixer gates having a plurality of signal input leads and a signal output lead, a regenerative feedback circuit from said signal output lead to one of said signal input leads, control means connected in said feedback circuit for rendering said circuit operative during predetermined intervals upon energization of said control means, input means connected to one of the other of said signal input leads, said mixer gate being actuated upon energization of said input means; the control means and input means connected to said first mixer gate being energized for partially overlapping intervals, said input means being the first energized; the said input means connected to said second mixer gate being connected to receive a portion of the signal developed in the feedback circuit of said first mixer gate, the control means and input means connected to said second mixer gate being energized for concurrent intervals; an inhibitor gate having at least one signal input lead, at least one inhibitor input lead, and an output lead; and a delay line, one of said signal input leads of said inhibitor gate connected to receive a portion of signal in the feedback circuit of said second mixer gate, said inhibitor input lead connected through said delay line to receive from said feedback circuit a pulse which is of suitable polarity to provide inhibition of said inhibitor gate.

4. The invention according to claim 3 in which the signal received by said second mixer gate from said first feedback circuit is equal to one half the signal developed in said feedback circuit.

5. A device for producing electric pulses of a controlled shape, phase, and duration, comprising a mixer gate having a plurality of signal input leads and a signal output lead, a regenerative feedback circuit from said signal output lead to one of said signal input leads, control means connected in said feedback circuit for rendering said circuit operative during predetermined intervals upon energization of said control means, input means connected to one of the other of said signal input leads, said mixer gate being actuated upon energization of said input means, the control means and input means connected to said mixer gate being energized for partially overlapping intervals, said input means being the first energized, second input means connected to receive a portion of the signal developed in the feedback circuit of said mixer gate, said second input means and said feedback circuit being energized for partially overlapping periods, said feedback circuit being the first energized, an inhibitor gate having at least one signal input lead and inhibitor input lead and an output lead, one of said signal input leads of said inhibitor gate connected to receive a signal from said second input means, an electrical delay line and said inhibitor input lead connected through said delay line to receive a pulse from said second input means which is of suitable polarity to provide inhibition of said inhibitor gate.

6. A device for producing electric pulses of a controlled shape, phase, and duration, comprising a first and a second mixer gate; each of said mixer gates having a plurality of signal input leads and a signal output lead, a regenerative feedback circuit from said signal output lead to one of said signal input leads, control means connected in said feedback circuit for rendering said circuit operative during predetermined intervals upon energization of said control means, input means connected to one of the other of said signal input leads, said mixer gate being actuated upon energization of said input means; the control means and input means connected to said first mixer gate being energized for partially overlapping intervals, said input means being the first energized; the said input means connected to said second mixer gate being connected to receive a portion of the signal developed in the feedback circuit of the said first mixer gate, the control means and input means connected to said second mixer gate being energized for concurrent intervals, and for a period which partially overlaps the period during which the feedback circuit associated with said first mixer gate is energized, said feedback circuit being the first energized; an inhibitor gate having at least one signal input lead, at least one inhibitor input lead, and an output lead; and a delay line, one of said signal input leads of said inhibitor gate connected to receive a portion of the signal in the feedback circuit of said second mixer gate, said inhibitor input lead connected through said delay line to receive from said feedback circuit a pulse which is of suitable polarity to provide inhibition of said inhibitor gate.

7. A device for producing pulses of a controlled shape, phase, and duration, comprising a first and a second coincidence gate, each of said coincidence gates having a plurality of signal input leads and an output lead, means for energizing the first of said coincidence gates during predetermined intervals upon the application of an input signal to one of said input leads, signal regenerative storage means having a plurality of stable states, means for causing the stable state obtained by said regenerative storage means to be dependent upon the amplitude of said input signal during the energization of said first coincidence gate, one of the input leads of said second coincidence gate being connected to an output of said regenerative storage means and means for energizing said second coincidence gate during a predetermined interval when said regenerative storage means has attained one of the aforesaid stable states.

8. A device for producing pulses of a controlled shape, phase, and duration, comprising a first and a second coincidence gate, each of said coincidence gates having a plurality of signal input leads and an output lead, means for energizing the first of said coincidence gates during predetermined intervals upon the application of an input signal to one of said input leads, signal regenerative storage means having a plurality of stable states, means for causing the stable state obtained by said regenerative storage means to be dependent upon the amplitude of said input signal during the energization of said first coincidence gate, one of the input leads of said second coincidence gate being connected to an output of said regenerative storage means and means for energizing said second coincidence gate during a predetermined interval when said regenerative storage means has attained one of the aforesaid stable states, an inhibitor gate having a plurality of input leads, at least one inhibitor input lead and an output lead, the output of said second coincidence gate being connected to energize one of the input leads of said inhibitor gate and means for connecting the output of said second coincidence gate to energize the inhibitor input of said inhibitor gate with a pulse of the proper phase and polarity.

References Cited in the file of this patent

UNITED STATES PATENTS

| | | |
|---|---|---|
| 2,482,974 | Gordon | Sept. 27, 1949 |
| 2,601,289 | Hollabaugh | June 24, 1952 |
| 2,643,330 | Borgeson | June 23, 1953 |
| 2,644,887 | Wolfe | July 7, 1953 |
| 2,651,717 | Uttley et al. | Sept. 8, 1953 |
| 2,724,780 | Harris | Nov. 22, 1955 |
| 2,748,269 | Slutz | May 29, 1956 |
| 2,756,329 | Lubkin | July 24, 1956 |